US008229403B2

(12) United States Patent
Jung et al.

(10) Patent No.: US 8,229,403 B2
(45) Date of Patent: Jul. 24, 2012

(54) CONTEXT-APPROPRIATE ANSWERING RESPONSES FOR A MOBILE COMMUNICATIONS DEVICE

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1159 days.

(21) Appl. No.: 11/906,114

(22) Filed: Sep. 27, 2007

(65) Prior Publication Data
US 2009/0088138 A1 Apr. 2, 2009

(51) Int. Cl.
*H04W 4/00* (2009.01)
(52) U.S. Cl. .................................. 455/414.1; 455/433
(58) Field of Classification Search ............ 455/433, 455/432.1, 428, 424, 550.1–553.1, 90.1–90.3, 455/556.2, 562.1, 425, 418–420, 466
See application file for complete search history.

(56) References Cited

U.S. PATENT DOCUMENTS

2002/0167488 A1* 11/2002 Hinckley et al. .............. 345/156
2003/0197597 A1* 10/2003 Bahl et al. .................... 340/7.58

OTHER PUBLICATIONS

"Communications Service Provider"; Wikipedia.org; bearing dates of Sep. 7, 2007 and Mar. 2007; p. 1; Wikimedia Foundation, Inc.; USA; printed on Sep. 19, 2007; located at http://en.wikipedia.org/wiki/Communications_Service_Provider.
Herrero, Daniel; "Communication Manager Pro (CommMgrPro)"; commmgrpro.com; pp. 1-6; printed on Sep. 18, 2007; located at http://www.commmgrpro.com/.
Rutkowski, Edward J.; "CommMgrPro V1.0.1—sophisticated profile manager—released"; msmobiles.com; Jun. 28, 2007; pp. 1-2; printed on Sep. 19, 2007; located at http://msmobiles.com/news.php/6483.html.

* cited by examiner

*Primary Examiner* — Kamran Afshar
*Assistant Examiner* — Kenneth Corbin

(57) ABSTRACT

Embodiments provide an apparatus, a system, a device, a computer program product, and a method. A method embodiment provides method implemented in a mobile communications device. The method includes determining an ambient environmental context of the mobile communications device. The method also includes selecting an answer to an incoming-communication that is at least substantially responsive to the determined environmental context of the mobile communications device. The method further includes facilitating a delivery of the selected answer in reply to an incoming communication to the mobile communications device.

42 Claims, 12 Drawing Sheets

Selecting an answer to an incoming-communication that is at least substantially responsive to the determined environmental context of the mobile communications device.

```
┌─────────────────────┐  ┌─────────────────────┐  ┌─────────────────────┐
│ 442  Selecting an   │  │ 444  Selecting an   │  │ 446  Selecting an   │
│ answer to an        │  │ answer to an        │  │ answer to an        │
│ incoming-           │  │ incoming-           │  │ incoming-           │
│ communication that  │  │ communication that  │  │ communication that  │
│ is at least         │  │ is at least         │  │ is at least         │
│ substantially       │  │ substantially       │  │ substantially       │
│ responsive to the   │  │ appropriate for the │  │ responsive to the   │
│ determined          │  │ determined          │  │ determined          │
│ environmental       │  │ environmental       │  │ environment         │
│ context of the      │  │ context of the      │  │ context of the      │
│ mobile              │  │ mobile              │  │ mobile              │
│ communications      │  │ communications      │  │ communications      │
│ device, the         │  │ device.             │  │ device from a       │
│ incoming-           │  │                     │  │ group of at least   │
│ communication       │  │                     │  │ two answers to an   │
│ including at least  │  │                     │  │ incoming-           │
│ one of a voice      │  │                     │  │ communication.      │
│ call, a message,    │  │                     │  │                     │
│ or an email.        │  │                     │  │                     │
└─────────────────────┘  └─────────────────────┘  └─────────────────────┘
```

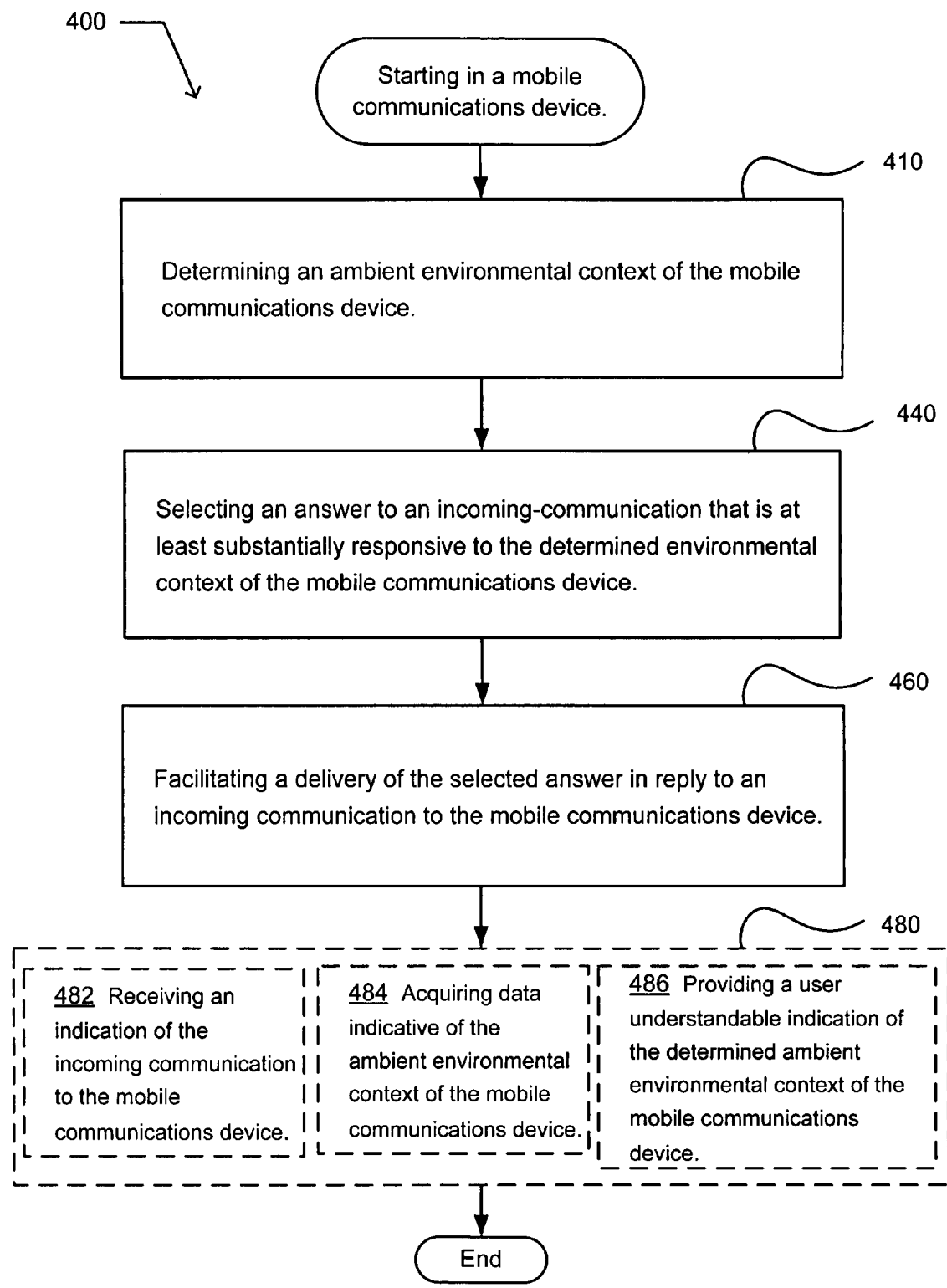

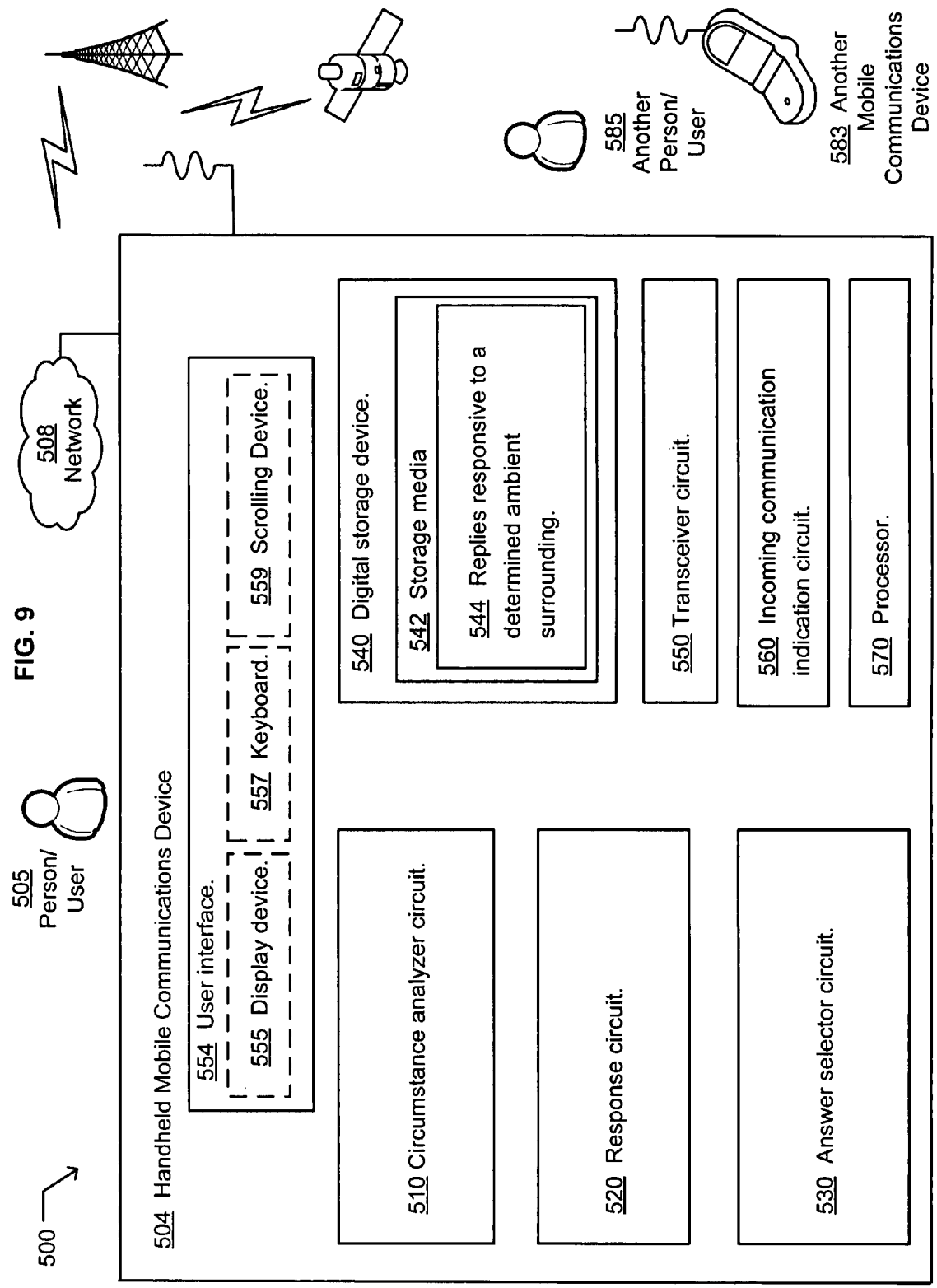

FIG. 10

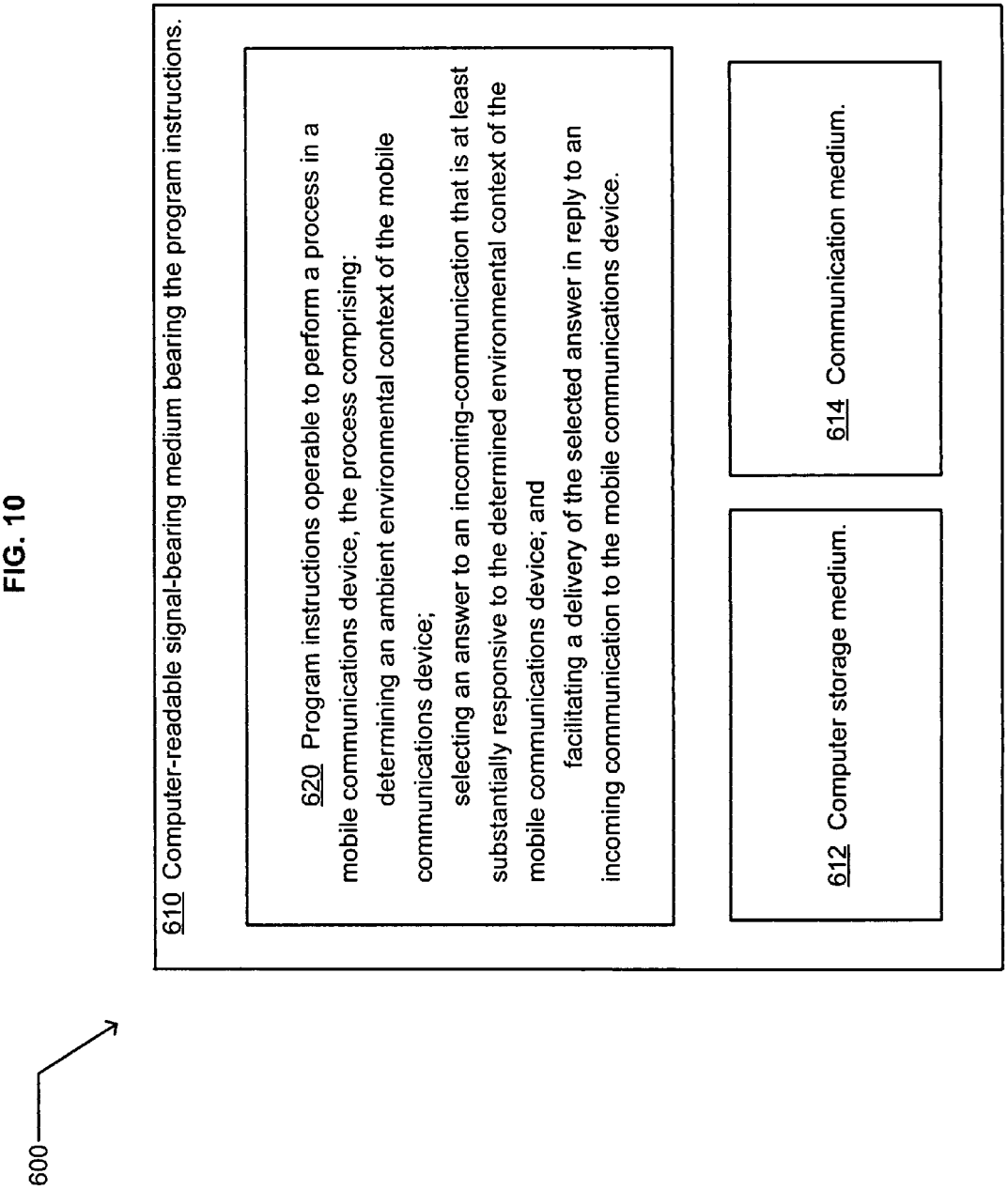

610 Computer-readable signal-bearing medium bearing the program instructions.

620 Program instructions operable to perform a process in a mobile communications device, the process comprising:
  determining an ambient environmental context of the mobile communications device;
  selecting an answer to an incoming-communication that is at least substantially responsive to the determined environmental context of the mobile communications device; and
    facilitating a delivery of the selected answer in reply to an incoming communication to the mobile communications device.

612 Computer storage medium.

614 Communication medium.

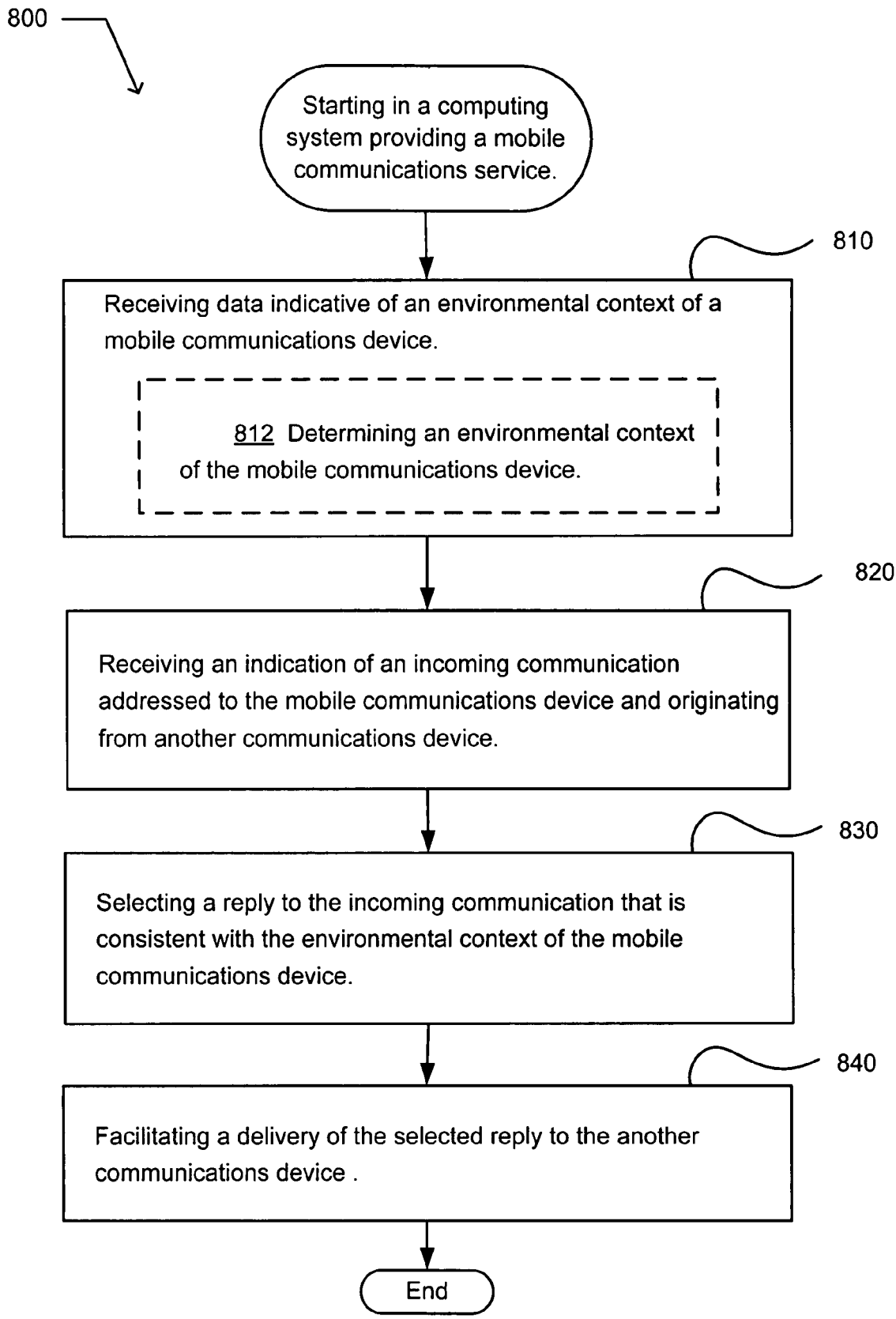

CONTEXT-APPROPRIATE ANSWERING RESPONSES FOR A MOBILE COMMUNICATIONS DEVICE

SUMMARY

An embodiment provides method implemented in a mobile communications device. The method includes determining an ambient environmental context of the mobile communications device. The method also includes selecting an answer to an incoming-communication that is at least substantially responsive to the determined environmental context of the mobile communications device. The method further includes facilitating a delivery of the selected answer in reply to an incoming communication to the mobile communications device. In an alternative embodiment, the method may include receiving an indication of the incoming communication to the mobile communications device. In another embodiment, the method may include acquiring data indicative of the ambient environmental context of the mobile communications device. In a further embodiment, the method may include providing a user understandable indication of the determined ambient environmental context of the mobile communications device. In addition to the foregoing, other method embodiments are described in the claims, drawings, and text that form a part of the present application.

Another embodiment provides a handheld mobile communications device. The handheld mobile communications device includes a circumstance analyzer circuit operable to determine an ambient surrounding of the handheld mobile communications device. The handheld mobile communications device also includes a response circuit operable to facilitate a delivery of a chosen reply to an originator of an incoming-communication. The handheld mobile communications device further includes an answer selector circuit operable to choose the reply to the incoming-communication that is at least substantially responsive to the determined ambient surrounding of the handheld mobile communications device. In an alternative embodiment, the handheld mobile communications device includes a transceiver circuit operable to transmit and/or receive communications. In addition to the foregoing, other device embodiments are described in the claims, drawings, and text that form a part of the present application.

A further embodiment provides a computer program product. The computer program product includes a computer-readable signal-bearing medium bearing program instructions. The program instructions include program instructions operable to perform a process in a mobile communications device. The process includes determining an ambient environmental context of the mobile communications device. The process also includes selecting an answer to an incoming-communication that is at least substantially responsive to the determined environmental context of the mobile communications device. The process further includes facilitating a delivery of the selected answer in reply to an incoming communication to the mobile communications device. In addition to the foregoing, other computer program product embodiments are described in the claims, drawings, and text that form a part of the present application.

An embodiment provides a mobile communications device. The mobile communications device includes means for determining an ambient environmental context of the mobile communications device. The mobile communications device also include means for selecting an answer to an incoming-communication that is at least substantially responsive to the determined environmental context of the mobile communications device. The mobile communications device further includes means for facilitating a delivery of the selected answer in reply to an incoming communication to the mobile communications device. In addition to the foregoing, other device embodiments are described in the claims, drawings, and text that form a part of the present application.

Another embodiment provides a method implemented in a computing system providing a mobile communications service. The method includes receiving data indicative of an environmental context of a mobile communications device. The method also includes receiving an indication of an incoming communication addressed to the mobile communications device and originating from another communications device. The method further includes selecting a reply to the incoming communication that is consistent with the environmental context of the mobile communications device. The method also includes facilitating a delivery of the selected reply to the another communications device. In addition to the foregoing, other method embodiments are described in the claims, drawings, and text that form a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIG. 6 illustrates another alternative embodiment of the operational flow of FIG. 4;

FIG. 8 illustrates an alternative embodiment of the operational flow of FIG. 4;

FIG. 9 illustrates an example environment that includes a handheld mobile communications device;

FIG. 10 illustrates an example computer program product;

FIG. 12 illustrates an example operational flow implemented in a computing system providing a mobile communications service.

DETAILED DESCRIPTION

Figure 1:
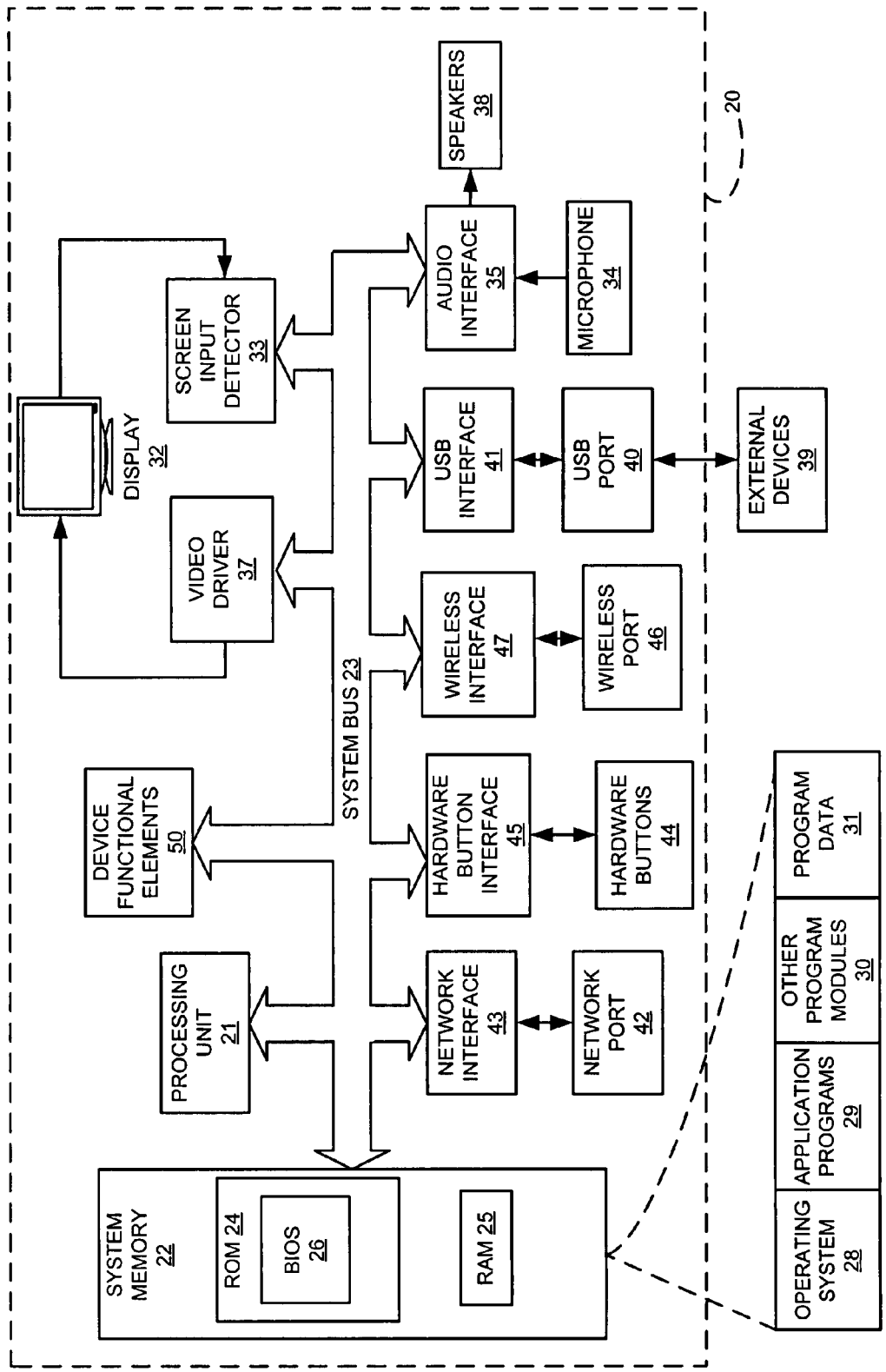
FIG. 1 illustrates an exemplary embodiment of a thin computing device in which embodiments may be implemented.

In the following detailed description, reference is made to the accompanying drawings, which form a part hereof. In the drawings, similar symbols typically identify similar components, unless context dictates otherwise. The illustrated embodiments described in the detailed description, drawings, and claims are not meant to be limiting. Other embodiments may be utilized, and other changes may be made, without departing from the spirit or scope of the subject matter presented here.

FIG. 1 and the following discussion are intended to provide a brief, general description of an environment in which embodiments may be implemented. FIG. 1 illustrates an exemplary system that includes a thin computing device 20, which may be included in an electronic device that also includes a device functional element 50. For example, the electronic device may include any item having electrical and/or electronic components playing a role in a functionality of the item, such as a limited resource computing device, a wireless communication device, a mobile wireless communication device, an electronic pen, a handheld electronic writing device, a digital camera, a scanner, an ultrasound device, an x-ray machine, a non-invasive imaging device, a cell phone, a printer, a refrigerator, a car, and an airplane. The thin computing device 20 includes a processing unit 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device 20, such as during start-up, is stored in the ROM 24. A number of program modules may be stored in the ROM 24 and/or RAM 25, including an operating system 28, one or more application programs 29, other program modules 30 and program data 31.

A user may enter commands and information into the computing device 20 through input devices, such as a number of switches and buttons, illustrated as hardware buttons 44, connected to the system via a suitable interface 45. Input devices may further include a touch-sensitive display screen 32 with suitable input detection circuitry 33. The output circuitry of the touch-sensitive display 32 is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device 20 may further include or be capable of connecting with a network through a network port 42 and network interface 43, and through wireless port 46 and corresponding wireless interface 47 may be provided to facilitate communication with other peripheral devices, including other computers, printers, and so on (not shown). It will be appreciated that the various components and connections shown are exemplary and other components and means of establishing communications links may be used.

The computing device 20 may be primarily designed to include a user interface. The user interface may include a character, a key-based, and/or another user data input via the touch sensitive display 32. The user interface may include using a stylus (not shown). Moreover, the user interface is not limited to an actual touch-sensitive panel arranged for directly receiving input, but may alternatively or in addition respond to another input device such as the microphone 34. For example, spoken words may be received at the microphone 34 and recognized. Alternatively, the computing device 20 may be designed to include a user interface having a physical keyboard (not shown).

The device functional elements 50 are typically application specific and related to a function of the electronic device, and is coupled with the system bus 23 through an interface (not shown). The functional elements may typically perform a single well-defined task with little or no user configuration or setup, such as a refrigerator keeping food cold, a cell phone connecting with an appropriate tower and transceiving voice or data information, and a camera capturing and saving an image.

Figure 2:
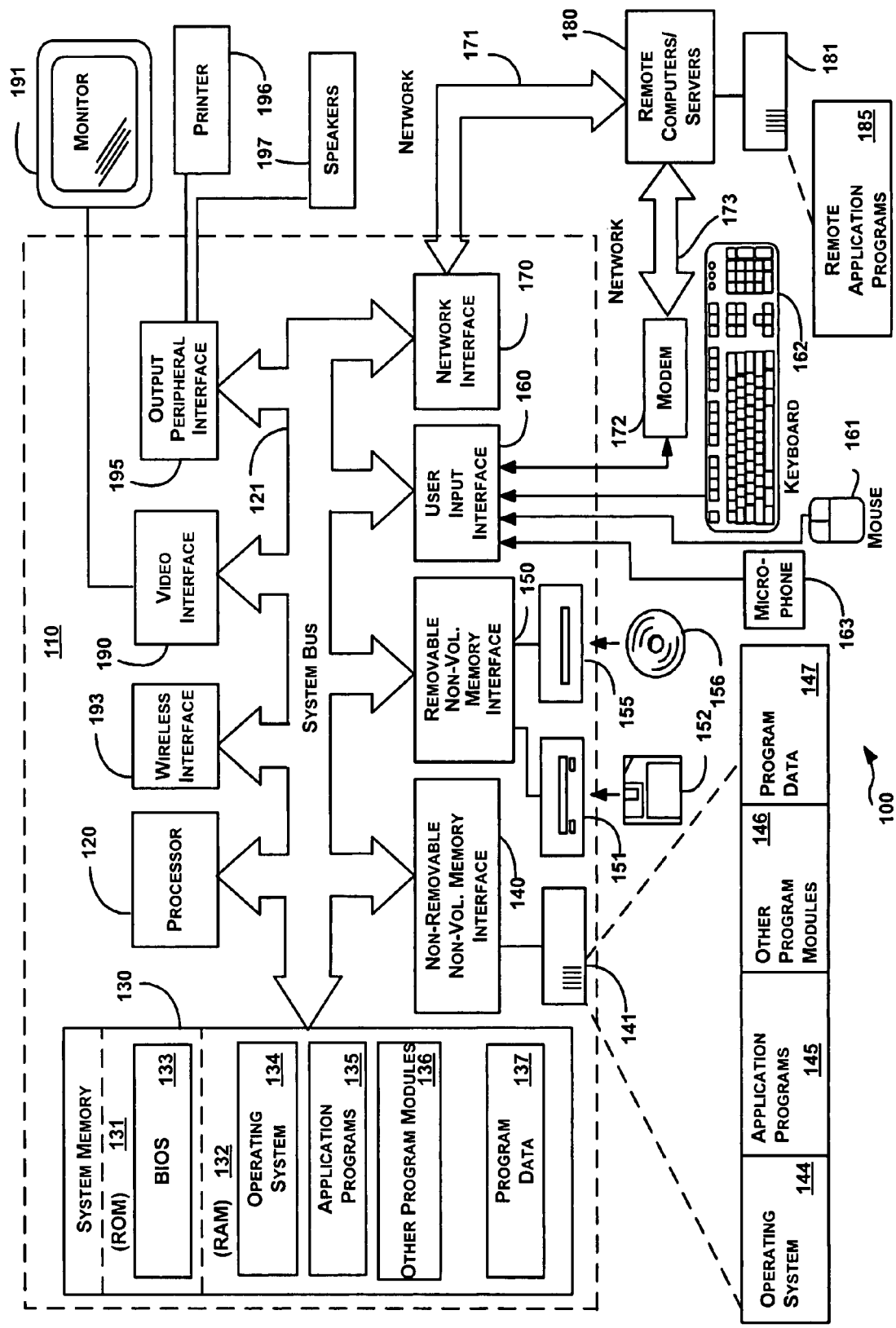
FIG. 2 illustrates an exemplary embodiment of a general-purpose computing system in which embodiments may be implemented.

FIG. 2 illustrates an exemplary embodiment of a general-purpose computing system in which embodiments may be implemented, shown as a computing system environment 100. Components of the computing system environment 100 may include, but are not limited to, a computing device 110 having a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, also known as Mezzanine bus.

The computing system environment 100 typically includes a variety of computer-readable media products. Computer-readable media may include any media that can be accessed by the computing device 110 and include both volatile and nonvolatile media, removable and non-removable media. By way of example, and not of limitation, computer-readable media may include computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, random-access memory (RAM), read-only memory (ROM), electrically erasable programmable read-only memory (EEPROM), flash memory, or other memory technology, CD-ROM, digital versatile disks (DVD), or other optical disk storage, magnetic cassettes, magnetic tape, magnetic disk storage, or other magnetic storage devices, or any other medium which can be used to store the desired information and which can be accessed by the computing device 110. In a further embodiment, a computer storage media may include a group of computer storage media devices. In another embodiment, a computer storage media may include an information store. In another embodiment, an information store may include a quantum memory, a photonic quantum memory, and/or atomic quantum memory. Combinations of any of the above may also be included within the scope of computer-readable media.

Communications media may typically embody computer-readable instructions, data structures, program modules, or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communications media include wired media such as a wired network and a direct-wired connection and wireless media such as acoustic, RF, optical, and infrared media.

The system memory 130 includes computer storage media in the form of volatile and nonvolatile memory such as ROM 131 and RAM 132. A RAM may include at least one of a DRAM, an EDO DRAM, a SDRAM, a RDRAM, a VRAM, and/or a DDR DRAM. A basic input/output system (BIOS) 133, containing the basic routines that help to transfer information between elements within the computing device 110, such as during start-up, is typically stored in ROM 131. RAM 132 typically contains data and program modules that are immediately accessible to or presently being operated on by processing unit 120. By way of example, and not limitation, FIG. 2 illustrates an operating system 134, application programs 135, other program modules 136, and program data 137. Often, the operating system 134 offers services to applications programs 135 by way of one or more application programming interfaces (APIs) (not shown). Because the operating system 134 incorporates these services, developers of applications programs 135 need not redevelop code to use the services. Examples of APIs provided by operating systems such as Microsoft's "WINDOWS" are well known in the art.

The computing device 110 may also include other removable/non-removable, volatile/nonvolatile computer storage media products. By way of example only, FIG. 2 illustrates a non-removable non-volatile memory interface (hard disk interface) 140 that reads from and writes for example to non-removable, non-volatile magnetic media. FIG. 2 also illustrates a removable non-volatile memory interface 150 that, for example, is coupled to a magnetic disk drive 151 that reads from and writes to a removable, non-volatile magnetic disk 152, and/or is coupled to an optical disk drive 155 that reads from and writes to a removable, non-volatile optical disk 156, such as a CD ROM. Other removable/nonremovable, volatile/non-volatile computer storage media that can be used in the exemplary operating environment include, but are not limited to, magnetic tape cassettes, memory cards, flash memory cards, DVDs, digital video tape, solid state RAM, and solid state ROM. The hard disk drive 141 is typically connected to the system bus 121 through a non-removable memory interface, such as the interface 140, and magnetic disk drive 151 and optical disk drive 155 are typically connected to the system bus 121 by a removable non-volatile memory interface, such as interface 150.

The drives and their associated computer storage media discussed above and illustrated in FIG. 2 provide storage of computer-readable instructions, data structures, program modules, and other data for the computing device 110. In FIG. 2, for example, hard disk drive 141 is illustrated as storing an operating system 144, application programs 145, other program modules 146, and program data 147. Note that these components can either be the same as or different from the operating system 134, application programs 135, other program modules 136, and program data 137. The operating system 144, application programs 145, other program modules 146, and program data 147 are given different numbers here to illustrate that, at a minimum, they are different copies. A user may enter commands and information into the computing device 110 through input devices such as a microphone 163, keyboard 162, and pointing device 161, commonly referred to as a mouse, trackball, or touch pad. Other input devices (not shown) may include a joystick, game pad, satellite dish, and scanner. These and other input devices are often connected to the processing unit 120 through a user input interface 160 that is coupled to the system bus, but may be connected by other interface and bus structures, such as a parallel port, game port, or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computing system environment 100 may operate in a networked environment using logical connections to one or more remote computers, such as a remote computer 180. The remote computer 180 may be a personal computer, a server, a router, a network PC, a peer device, or other common network node, and typically includes many or all of the elements described above relative to the computing device 110, although only a memory storage device 181 has been illustrated in FIG. 2. The network logical connections depicted in FIG. 2 include a local area network (LAN) and a wide area network (WAN), and may also include other networks such as a personal area network (PAN) (not shown). Such networking environments are commonplace in offices, enterprise-wide computer networks, intranets, and the Internet.

When used in a networking environment, the computing system environment 100 is connected to the network 171 through a network interface, such as the network interface 170, the modem 172, and/or the wireless interface 193. The network may include a LAN network environment, and/or a WAN network environment, such as the Internet. In a networked environment, program modules depicted relative to the computing device 110, or portions thereof, may be stored in a remote memory storage device. By way of example, and not limitation, FIG. 2 illustrates remote application programs 185 as residing on computer storage medium 181. It will be appreciated that the network connections shown are exemplary and other means of establishing communications link between the computers may be used.

Figure 3:
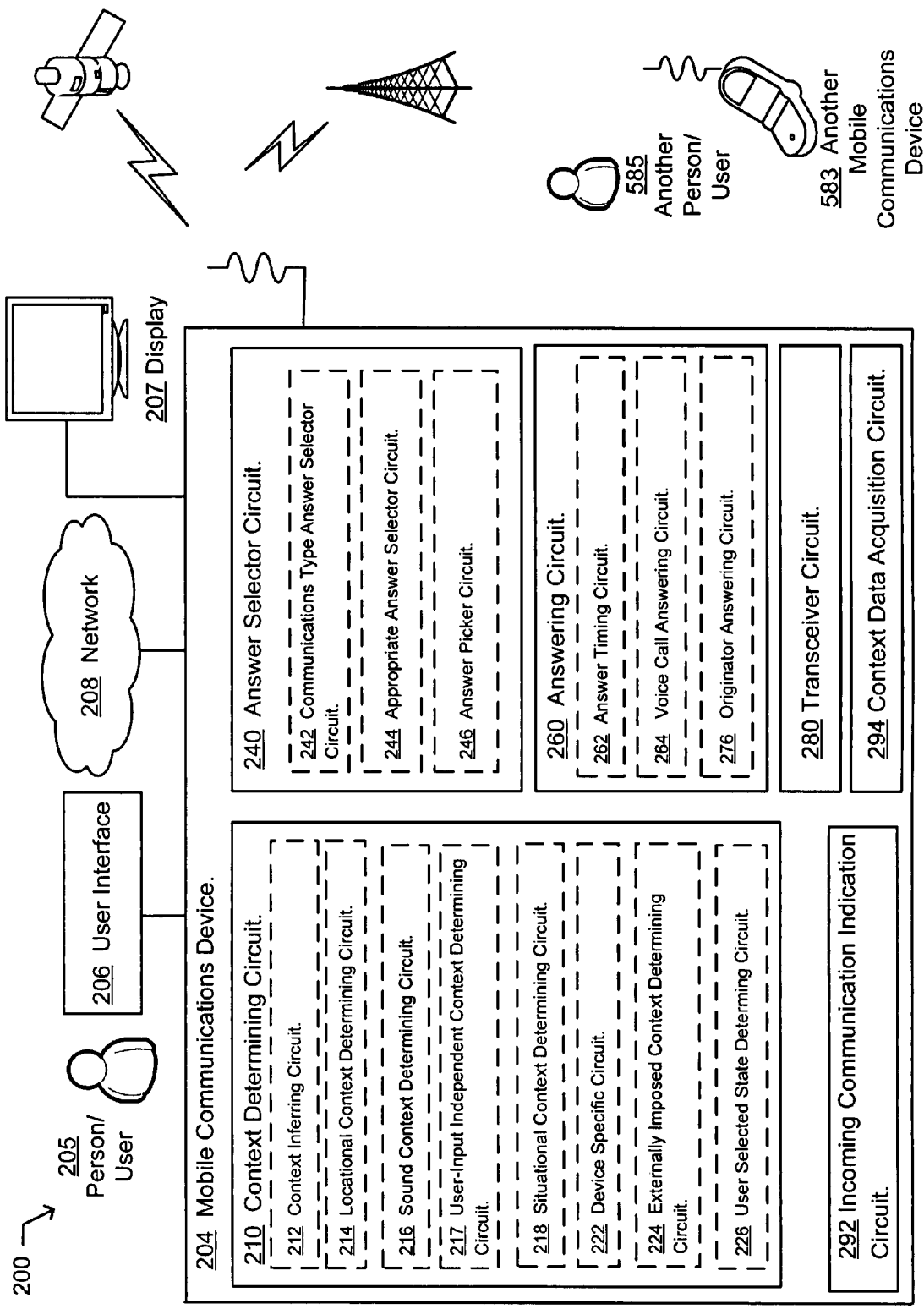
FIG. 3 illustrates an exemplary system in which embodiments may be implemented.

FIG. 3 illustrates an example system 200 in which embodiments may be implemented. The example system includes a mobile communications device 204, a user interface 206, and a display 207. The user interface may be physically incorporated with the mobile communications device, or may be physically separate from the mobile communications device and electronically coupled with the device. The display may be physically incorporated with the mobile communications device, or may be physically separate from the mobile communications device and electronically coupled with the device. In an embodiment, the mobile communications device is wirelessly coupled with cellular network, illustrated as a network 208. The cellular network may include a mobile cellular telephone network, and/or a satellite telephone network. In another embodiment, the system may include a wired or wireless access to digital content, such as via the network 208. In an alternative embodiment, the mobile communications device may be coupled to a network, such as the network 208, via a wireless link, a satellite link, and/or a wired link. In a further embodiment, the mobile communications device may be coupled to the Internet via a wireless link, a satellite link, and/or a wired link.

In an embodiment, the mobile communications device 204 includes a context determining circuit 210, an answer selector circuit 230, and an answering circuit 260. In some embodiments, one or more of the context determining circuit, the answer selector circuit, and the answering circuit may be structurally distinct from the remaining circuits. In an embodiment, the mobile communications device or a portion of the mobile communications device may be implemented in whole or in part using the thin computing device 20 described in conjunction with FIG. 1, and/or the computing device 110 described in conjunction with FIG. 2. In another embodiment, the mobile communications device or a portion of the mobile communications device may be implemented using Application Specific Integrated Circuits (ASICs), Field Programmable Gate Arrays (FPGAs), digital signal processors (DSPs), or other integrated formats. In a further embodiment, one or more of the circuits and/or the machine may be implemented in hardware, software, and/or firmware. A person 205 may interact with the mobile communications device 204 via a user interface 206 and/or a display 207. The display may include a visual display provided by a display surface and/or an audio display provided by a speaker.

The mobile communications device 204 may include at least one additional circuit. The at least one additional circuit may include a transceiver circuit 280, an incoming communication indicator circuit 292, or a context data acquisition circuit 294. In addition, the mobile communications device may include a processor (not illustrated), such as the processing unit 21 described in conjunction with FIG. 1, and/or the processor 120 described in conjunction with FIG. 2. In further addition, the mobile communications device may include a computer storage media (not illustrated). The computer storage media may include a computer storage media operable to store at least two answers to an incoming communication that are at least substantially responsive to a determined environmental context of the mobile communications device. In an embodiment, the mobile communications device may include a handheld mobile communications device.

Also illustrated is another mobile communications device 583 that may be used by another person/user 585 to communicate with the person/user 205 via the mobile communications device 204.

In an embodiment, the context determining circuit 210 may include at least one additional circuit. The at least one additional circuit may include at least one of a context inferring circuit 212, a locational context determining circuit 214, a sound context determining circuit 216, a user-input independent context determining circuit 217, a situational context determining circuit 218, a device specific circuit 222, an externally imposed context determining circuit 224, or a user selected state determining circuit 226.

In another embodiment, the answer selector circuit 240 may include at least one additional circuit. The at least one additional circuit may include at least one of a communications type answer selector circuit 242, an appropriate answer selector circuit 244, or an answer picker circuit 246. In a further embodiment, the answering circuit 260 may include at least one additional circuit. The at least one additional circuit may include at least one of an answer timing circuit 262, a voice call answering circuit 274, or an originator answering circuit 276.

Figure 4:
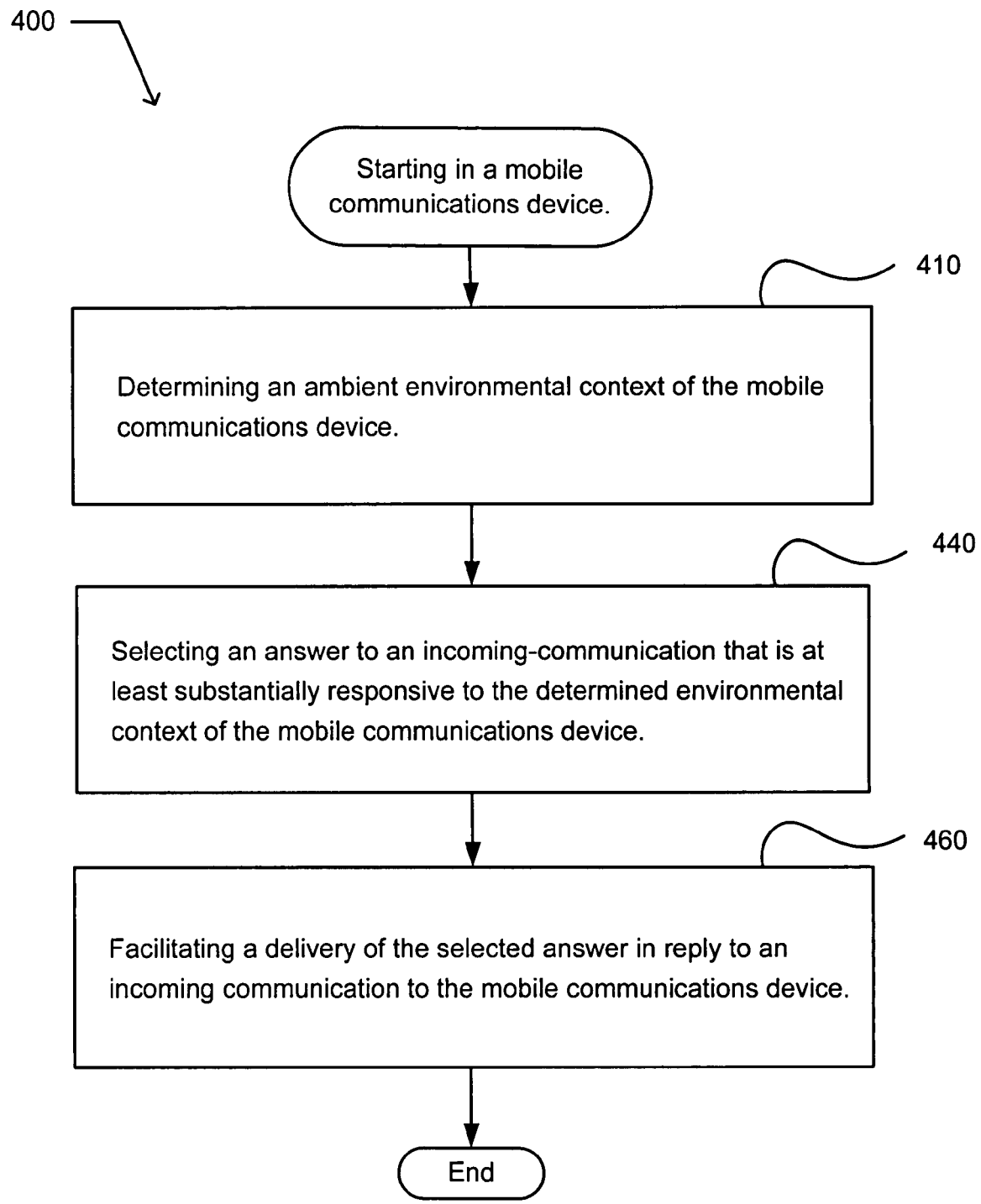
FIG. 4 illustrates an example of an operational flow implemented in a mobile communications device.
Figure 5:
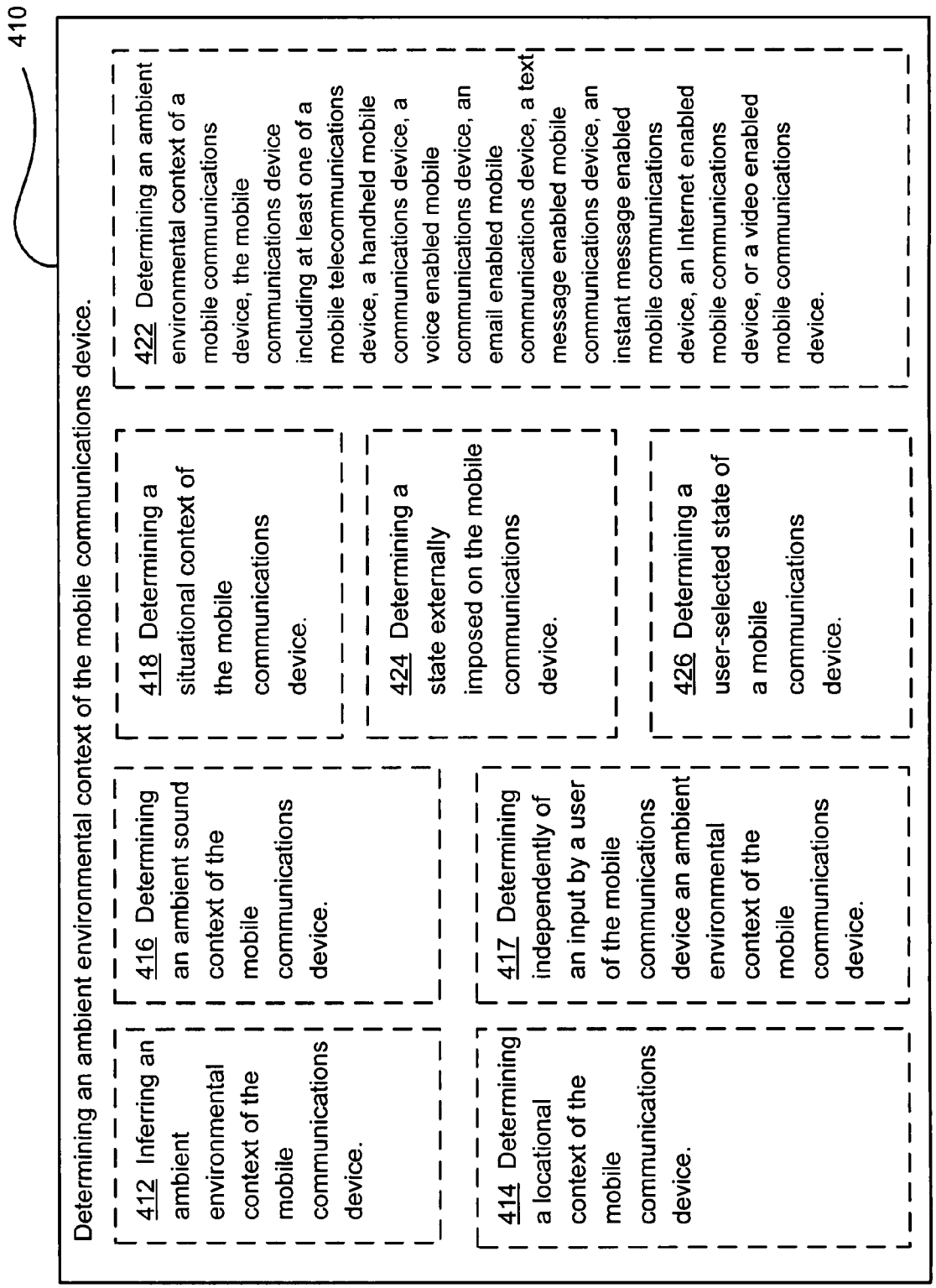
FIG. 5 illustrates an alternative embodiment of the operational flow of FIG. 4.

FIG. 4 illustrates an example of an operational flow 400 implemented in a mobile communications device. FIG. 5 and several following figures may include various examples of operational flows, discussions, and explanations with respect to the above-described system 300 of FIG. 3, and/or with respect to other examples and contexts, such as FIGS. 1-2. However, it should be understood that the operational flows may be executed in another environment and/or context, and/or in a modified version of FIG. 3. Also, although the various operational flows are illustrated in a sequence(s), it should be understood that the various operations may be performed in other orders than those which are illustrated, and/or may be performed concurrently.

After a start operation, the operational flow 400 includes a context operation 410. The context operation determines an ambient environmental context of the mobile communications device. In an embodiment, the ambient environmental context of the mobile communications device is determined in response to real time data that is at least in part indicative of the current ambient environmental context of the mobile communications device. In another embodiment, the ambient environmental context of the mobile communications device is determined in response to currently sensed data that is at least in part indicative of the current ambient environmental context of the mobile communications device. In a further embodiment, the ambient environmental context of the mobile communications device is determined in response to currently observed data that is at least in part indicative of the current ambient environmental context of the mobile communications device. The context operation may be implemented using the context determining circuit 210 of FIG. 3. A choosing operation 440 selects an answer to an incoming-communication that is at least substantially responsive to the determined environmental context of the mobile communications device. In an embodiment, the answer to an incoming-communication that is at least substantially responsive to the determined environmental context of the mobile communications device may be selected from at least two answers. In another embodiment, the selected answer to an incoming-communication that is at least substantially responsive to the determined environmental context of the mobile communications device may be formulated from at least two answers. The choosing operation may be implemented using the answer selector circuit 240. A contextual reply operation 460 facilitates a delivery of the selected answer in reply to an incoming communication to the mobile communications device. The contextual reply operation may be implemented using the answering circuit 260. The operational flow then moves to an end operation.

FIG. 5 illustrates an alternative embodiment of the operational flow 400 of FIG. 4. The context operation 410 may include at least one additional operation. The at least one additional operation may include an operation 412, an operation 414, an operation 415 (not shown), an operation 416, an operation 417, an operation 418, an operation 422, an operation 424, or an operation 426. The operation 412 infers an ambient environmental context of the mobile communications device. The operation 412 may be implemented using the context inferring circuit 212 of FIG. 3. The operation 414 determines a locational context of the mobile communications device. In an embodiment, a locational context is distinguished from a position. A position may include a latitude and longitude as might be provided by a global positioning system (GPS). A position may include a cell of a cellular network communicating with the mobile communications device, or a location area code of a cellular network communicating with the mobile communications device. A locational context may include a reference to a human constructed improvement, such as a building, a place, a structure, or a geographic feature, such as a ski area or the Grand Canyon, that may influence an appropriate answer or response to an incoming communication to the mobile communications device. In another embodiment, a locational context may include a locational context determined in response to at least two different factors. For example, a locational context may be determined by combining a position and a map correlating the position with a human constructed improvement. The operation 414 may be implemented using the locational context determining circuit 214. The operation 415 (not shown) determines an ambient light environmental context of the mobile communications device. The operation 416 determines an ambient sound context of the mobile communications device. In an embodiment, the ambient sound may include an ambient sound level, or an ambient sound characteristic. For example, a sound context may include at least one of loud voices, such as cheering at a football game, melodic voices, such as singing at a concert, or musical tones, such as at a concert. The operation 416 may be implemented using the sound context determining circuit 216. The operation 417 determines independently of an input by a user of the mobile communications device an ambient environmental context of the mobile communications device. The operation 417 may be implemented using the user-input independent context determining circuit 217.

The operation 418 determines a situational context of the mobile communications device. For example, a situational context may include at least one of a movie theater, football game, lecture, meeting, or concert situational context. In an embodiment, a situational context may be sensed by detecting a presence of a high density of nearby cellular phones. A further detection may include at least one of detecting a regularity of an array of static cellular phones such as in meeting or theater, and/or an irregularity of an array of moving cellular phone such as in highway traffic. By way of further example, a situational context may include a workplace, schoolroom, courtroom, hospital, or surgical suite situational context. Another example of a situational context may include at least one of a golf course, riding in a car, jogging, bicycle riding, or a particular user activity level situational context. The operation 418 may be implemented using the situational context determining circuit 218.

The operation 422 determines an ambient environmental context of a mobile communications device. The mobile communications device including at least one of a mobile telecommunications device, a handheld mobile communications device, a voice enabled mobile communications device, an email enabled mobile communications device, a text message enabled mobile communications device, an instant message enabled mobile communications device, an Internet enabled mobile communications device, or a video enabled mobile communications device. The operation 422 may be implemented using the device specific circuit 222. The operation 424 determines a state externally imposed on the mobile communications device. For example, an externally imposed ambient environmental context may include an externally imposed rule on the mobile communications device, such as the mobile communications device is disabled from ringing by a theater, or set to "vibrate only" in a theater. The operation 424 may be implemented using the externally imposed context determining circuit 224. The operation 426 determines a user-selected state of the mobile communications device. For example, a user-selected state may include a ring-muted, or a low volume ring state. The operation 426 may be implemented using the user selected state determining circuit 226.

FIG. 6 illustrates another alternative embodiment of the operational flow 400 of FIG. 4. The choosing operation 440 may include at least one additional operation. The at least one additional operation may include an operation 442, an operation 444, or an operation 446. The operation 442 selects an answer to an incoming-communication that is at least substantially responsive to the determined environmental context of the mobile communications device. The incoming-communication including at least one of a voice call, a message, or an email. The operation 442 may be implemented using the communications type answer circuit 242. The operation 444 selects an answer to an incoming-communication that is at least substantially appropriate for the determined environmental context of the mobile communications device. The operation 444 may be implemented using the appropriate answer selector circuit 244.

The operation 446 selects an answer to an incoming-communication that is at least substantially responsive to the determined environment context of the mobile communications device from a group of at least two answers to an incoming-communication. For example, a selected answer may include "Jane is in a theater and should only be disturbed in an emergency." A selected answer to an incoming-communication that is at least substantially responsive to the determined environment context of the mobile communications device may include presenting context-dependent options to the caller. For example, "Jane is in a theater and should only be disturbed in an emergency . . . in which case, please allow the phone to continue ringing until Jane has time to find a place to answer." Another example includes "the phone you are calling is muted," or "the phone you are calling is set to ring quietly, and is in a noisy environment, and therefore will likely not be heard." An answer to an incoming-communication that is at least substantially responsive to the determined environment context of the mobile communications device may include presenting callers with a device state and or a context dependent option. For example, the user of the mobile communications device presses "5" on a keypad when they are temporarily busy or in the middle of something, the mobile communications device answers the call with a short message "Hold on a minute, Jane is in the middle of something but she will be right with you." By way of further example, the user pressing "3" on the keypad while driving answers an incoming-communication in speakerphone mode but first plays a short answering message "I'll be answering your call on speakerphone" before automatically answering in speaker phone mode. In another example, the user pressing "4" on the keypad while in a movie answers a call with a message "I'm at the movies, so please leave a message unless this is very urgent." If no message is left, the mobile communications device would begin ringing with increasing urgency until answered, while playing a message to the caller that "it may take me some time to pick up as I have to leave the theater and find a private place to take your call." An answer to an incoming-communication that is at least substantially responsive to the determined environment context of the mobile communications device may include presenting a selected ring type, volume, or behavior (e.g. increasing ring, number of rings before switching to voice mail or forwarding, a selected voice mail behavior (e.g. selection of a particular voice mailbox, etc), a selected message, a trigger matched to configurations including detected or inferred context (e.g., on the road, alone at home, not in user's presence). The operation 446 may be implemented using the answer picker circuit 246.

Figure 7:
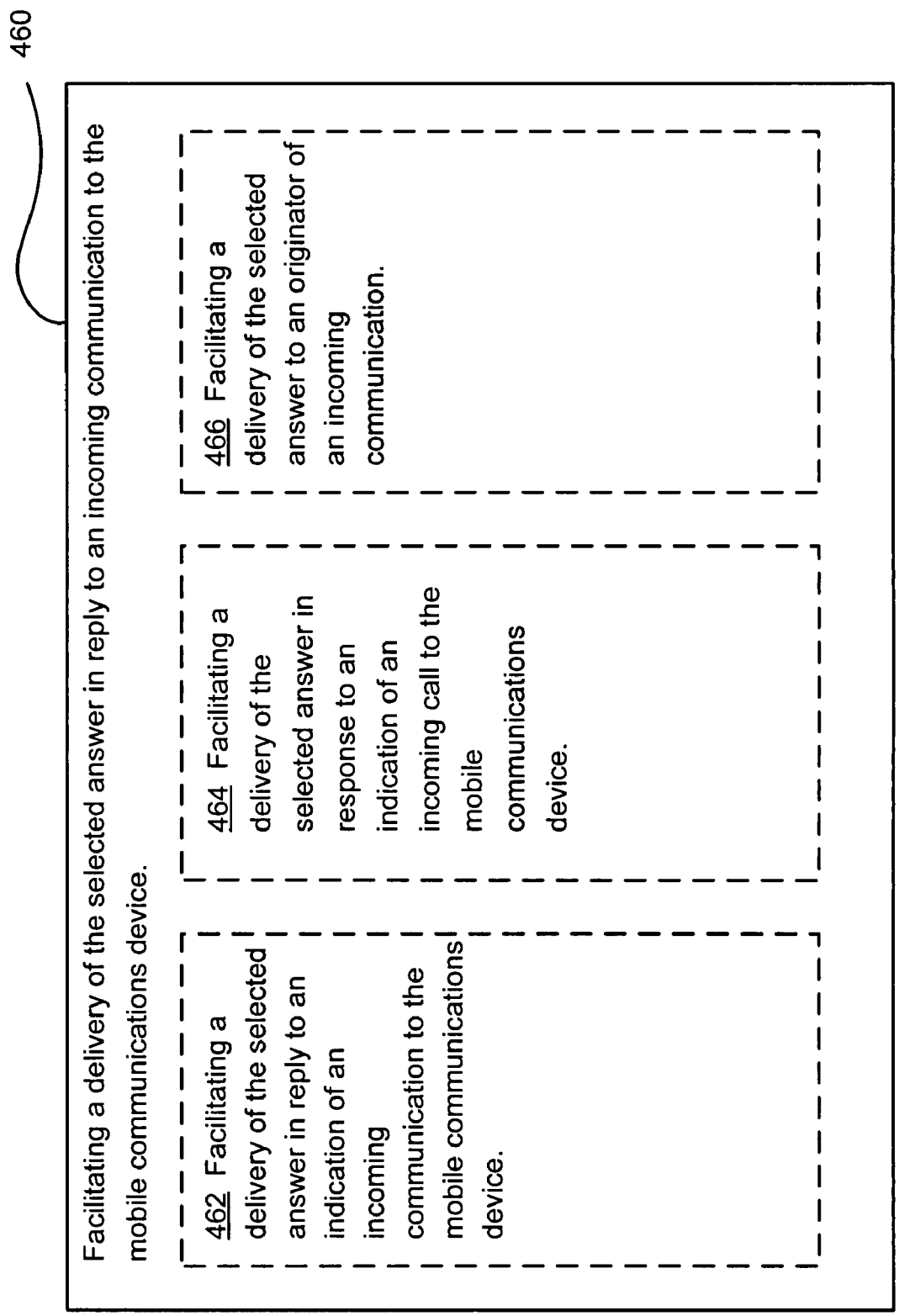
FIG. 7 illustrates a further alternative embodiment of the operational flow of FIG. 4.

FIG. 7 illustrates a further alternative embodiment of the operational flow 400 of FIG. 4. The contextual reply operation 460 may include at least one additional operation. The at least one additional operation may include an operation 462, an operation 464, or an operation 466. The operation 462 facilitates a delivery of the selected answer in reply to an indication of an incoming communication to the mobile communications device. The operation 462 may be implemented using the answer timing circuit 262. The operation 464 facilitates a delivery of the selected answer in response to an indication of an incoming call to the mobile communications device. The operation 464 may be implemented using the voice call answering circuit 264. The operation 466 facilitates a delivery of the selected answer to an originator of the incoming communication. The operation 466 may be implemented using the originator answering circuit 276.

FIG. 8 illustrates an alternative embodiment of the operational flow 400 of FIG. 4. The operational flow 400 may include at least one additional operation 480. The at least one additional operation may include at least one of an operation 482, an operation 484, or an operation 486. The operation 482 receives an indication of the incoming communication to the mobile communications device. In an embodiment, the context operation 410 occurs in response to the operation 482 receiving an indication of the incoming communication to the mobile communications device. The operation 482 may be implemented using the incoming communication indication circuit 282. The operation 484 acquires data indicative of the ambient environmental context of the mobile communications device. In an embodiment, the data indicative of the ambient environmental context may be acquired by a microphone, such as by the microphone 34 of FIG. 1. In another embodiment, the data indicative of the ambient environmental context may be acquired by a GPS receiver associated with the mobile communications device (not shown). In a further embodiment, the data indicative of the ambient environmental context may be acquired by a receiver operable to receive signals from another mobile communications device, such as the another mobile communications device 583 of FIG. 3. The operation 486 (not shown) provides a user understandable indication of the determined ambient environmental context of the mobile communications device.

FIG. 9 illustrates an example environment 500 that includes a handheld mobile communications device 504. The handheld mobile communications device includes a circumstances analyzer circuit 510, a response circuit 520, and an answer selector circuit 530. The mobile communications device may include at least one of a user interface 554, a digital storage device 540, a transceiver circuit 550, an incoming communication indication circuit 560, or a processor 570.

The circumstance analyzer circuit 510 includes a circumstance analyzer circuit operable to determine an ambient surrounding of the handheld mobile communications device 504. For example, an ambient surrounding may include a density of people proximate to the handheld mobile communications device, a type of ambient sound proximate to the handheld mobile communications device, such as a cheering crowd, a loud rock concert, a movie, or a symphony, or an activity pattern of a user associated with the handheld mobile communications device, such as an activity pattern associated with riding a bicycle. The response circuit 520 includes a response circuit operable to facilitate a delivery of a chosen reply to an originator of an incoming-communication. The answer circuit 530 includes an answer selector circuit operable to choose the reply to the incoming-communication that is at least substantially responsive to the determined ambient surrounding of the handheld mobile communications device. The reply may be chosen from replies responsive to a determined ambient surrounding 544 saved to a storage media 542 of the digital storage device 540.

The transceiver circuit 550 may include a transceiver circuit operable to transmit and/or receive communications. In an alternative embodiment, the transceiver circuit may include a transceiver circuit operable to transmit and/or receive at least one of a voice, email, data, or video communications. In another embodiment, the circumstance analyzer circuit 510 further includes a circumstance analyzer circuit operable to determine an ambient surrounding of the handheld mobile communications device. The ambient surrounding including at least one of a locational setting, a surrounding sound characteristic, a situational context, a state of the handheld mobile device, or a proximity to other handheld mobile communications devices. In a further embodiment, the response circuit 520 further includes a response circuit operable to facilitate a delivery of a chosen reply to an originator of an incoming-communication. The facilitation of delivery includes at least one of sending the chosen reply, causing a service provider to send the chosen reply, or authorizing another communications device to send the chosen reply. In an alternative embodiment, the answer selector circuit 530 further includes an answer selector circuit operable to choose reply from among at least two replies to the incoming-communication that is at least substantially responsive to the determined ambient surrounding of the handheld mobile communications device.

FIG. 10 illustrates an example computer program product 600. The computer program product includes a computer-readable signal-bearing medium 610 bearing program instructions 620. The program instructions include program instructions operable to perform a process in a mobile communications device. The process includes determining an ambient environmental context of the mobile communications device. The process also includes selecting an answer to an incoming-communication that is at least substantially responsive to the determined environmental context of the mobile communications device. The process further includes facilitating a delivery of the selected answer in reply to an incoming communication to the mobile communications device. In an alternative embodiment, the computer-readable signal-bearing medium includes a computer storage medium 612. In another alternative embodiment, the computer-readable signal-bearing medium includes a communication medium 614.

Figure 11:
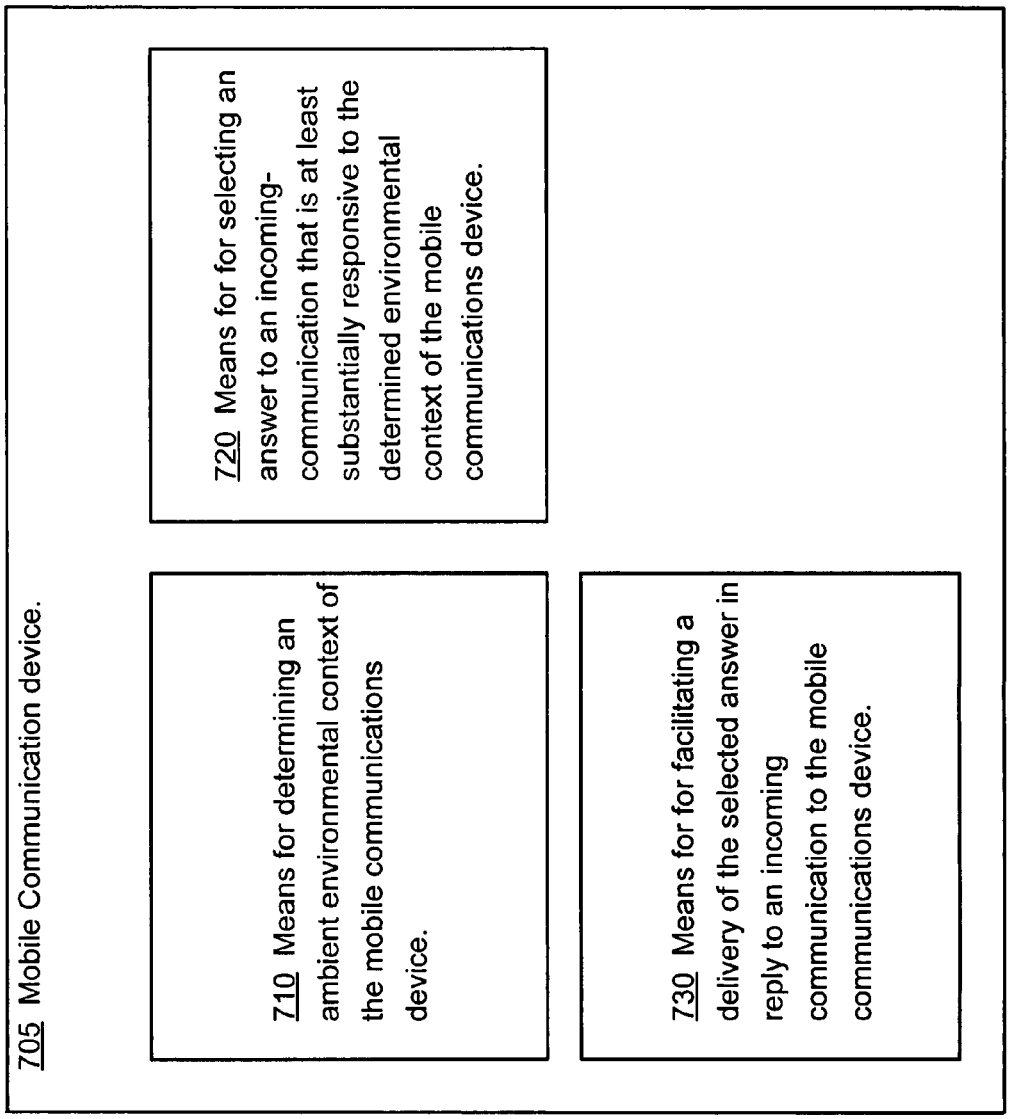
FIG. 11 illustrates an example mobile communications device.

FIG. 11 illustrates an example mobile communications device 700. The mobile communications device includes means 710 for determining an ambient environmental context of the mobile communications device. The mobile communications device includes means 720 for selecting an answer to an incoming-communication that is at least substantially responsive to the determined environmental context of the mobile communications device. The mobile communications device also includes means 730 for facilitating a delivery of the selected answer in reply to an incoming communication to the mobile communications device.

FIG. 12 illustrates an example operational flow 800 implemented in a computing system providing a mobile communications service. In an embodiment, the computing system includes at least one of a computing system assisting a provision of telecommunications, email, or textual mobile communications services. After a start operation performed in the computing system, the operational flow includes a context operation 810 that receives data indicative of an environmental context of a mobile communications device. In an alternative embodiment, the context operation includes an operation 812 that determines an environmental context of the mobile communications device in communication with the communications service provider. An inbound operation 820 receives an indication of an incoming communication addressed to the mobile communications device and originating from another communications device. A picking operation 830 selects a reply to the incoming communication that is consistent with the environmental context of the mobile communications device. A response operation 840 facilitates a delivery of the selected reply to the another communications device. The operational flow then moves to an end operation.

The foregoing detailed description has set forth various embodiments of the systems, apparatus, devices, computer program products, and/or processes using block diagrams, flow diagrams, operation diagrams, flowcharts, illustrations, and/or examples. A particular block diagram, operation diagram, flowchart, illustration, environment, and/or example should not be interpreted as having any dependency or requirement relating to any one or combination of components illustrated therein. For example, in certain instances, one or more elements of an environment may be deemed not necessary and omitted. In other instances, one or more other elements may be deemed necessary and added.

Insofar as such block diagrams, operation diagrams, flowcharts, illustrations, and/or examples contain one or more functions and/or operations, it will be understood that each function and/or operation within such block diagrams, operation diagrams, flowcharts, illustrations, or examples can be implemented, individually and/or collectively, by a wide range of hardware, software, firmware, or virtually any combination thereof unless otherwise indicated. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware. Those skilled in the art will recognize that optical aspects of implementations will typically employ optically-oriented hardware, software, and or firmware.

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A handheld mobile communications device comprising:
a circumstance analyzer circuit operable to determine an ambient surrounding of the handheld mobile communications device;
a response circuit operable to facilitate a delivery of a chosen reply to an originator of an incoming-communication, wherein the response circuit operable to facilitate a delivery of a chosen reply to an originator of an incoming-communication further includes:
the response circuit operable to facilitate a delivery of a chosen reply to an originator of an incoming-communication, the facilitation of delivery includes at least one of sending the chosen reply, causing a service provider to send the chosen reply, or authorizing another communications device to send the chosen reply; and
an answer selector circuit operable to choose the reply to the incoming-communication that is at least substantially responsive to the determined ambient surrounding of the handheld mobile communications device.

2. A handheld mobile communications device comprising:
a circumstance analyzer circuit operable to determine an ambient surrounding of the handheld mobile communications device;
a response circuit operable to facilitate a delivery of a chosen reply to an originator of an incoming-communication; and
an answer selector circuit operable to choose the reply to the incoming-communication that is at least substantially responsive to the determined ambient surrounding of the handheld mobile communications device, wherein the answer selector circuit operable to choose the reply to the incoming-communication that is at least substantially responsive to the determined ambient surrounding of the handheld mobile communications device further includes:
the answer selector circuit operable to choose a reply from among at least two replies to the incoming-communication that is at least substantially responsive to the determined ambient surrounding of the handheld mobile communications device.

3. The handheld mobile communications device of claim 1, further comprising:
means for determining an ambient environmental context of the mobile communications device;
means for selecting an answer to an incoming-communication that is at least substantially responsive to the determined environmental context of the mobile communications device; and
means for facilitating a delivery of the selected answer in reply to an incoming communication to the mobile communications device.

4. The handheld mobile communications device of claim 1, further comprising:
the circumstance analyzer circuit is operable to receive data indicative of an ambient environmental context of a mobile communications device;
the circumstance analyzer circuit is operable to receive an indication of an incoming communication addressed to the mobile communications device and originating from another communications device;
the answer selector circuit is operable to select a reply to the incoming communication that is consistent with the ambient environmental context of the mobile communications device; and
the response circuit is operable to facilitate a delivery of the selected reply to the another communications device.

5. The handheld mobile communications device of claim 1, further comprising:
a transceiver circuit operable to transmit and/or receive communications.

6. The handheld mobile communications device of claim 1, wherein the circumstance analyzer circuit operable to determine an ambient surrounding of the handheld mobile communications device further includes:
a circumstance analyzer circuit operable to determine an ambient surrounding of the handheld mobile communications device, the ambient surrounding including at least one of a locational setting, a surrounding sound characteristic, a situational context, a state of the handheld mobile device, or a proximity to other handheld mobile communications devices.

7. The handheld mobile communications device of claim 1, wherein:
the circumstance analyzer circuit is operable to determine an ambient environmental context of the mobile communications device;

the answer selector circuit is operable to select an answer to an incoming-communication that is at least substantially responsive to the determined environmental context of the mobile communications device; and the response circuit is operable to facilitate a delivery of the selected answer in reply to an incoming communication to the mobile communications device.

8. The handheld mobile communications device of claim 7, wherein:

the circumstance analyzer circuit is operable to infer an ambient environmental context of the mobile communications device.

9. The handheld mobile communications device of claim 7, wherein:

the circumstance analyzer circuit is operable to determine a locational context of the mobile communications device.

10. The handheld mobile communications device of claim 7, wherein:

the circumstance analyzer circuit is operable to determine an ambient sound context of the mobile communications device.

11. The handheld mobile communications device of claim 7, wherein:

the circumstance analyzer circuit is operable to determine an ambient light environmental context of the mobile communications device.

12. The handheld mobile communications device of claim 7, wherein:

the circumstance analyzer circuit is operable to determine independently of an input by a user of the mobile communications device an ambient environmental context of the mobile communications device.

13. The handheld mobile communications device of claim 7, wherein:

the circumstance analyzer circuit is operable to determine a situational context of the mobile communications device.

14. The handheld mobile communications device of claim 7, wherein:

the circumstance analyzer circuit is operable to determine a state externally imposed on the mobile communications device.

15. The handheld mobile communications device of claim 7, wherein:

the circumstance analyzer circuit is operable to determine a user-selected state of a mobile communications device.

16. The handheld mobile communications device of claim 7, wherein:

the answer selector circuit is operable to select an answer to an incoming-communication that is at least substantially appropriate for the determined environmental context of the mobile communications device.

17. The handheld mobile communications device of claim 7, wherein:

the answer selector circuit is operable to select an answer to an incoming-communication that is at least substantially responsive to the determined environment context of the mobile communications device from a group of at least two answers to an incoming-communication.

18. The handheld mobile communications device of claim 7, wherein:

the response circuit is operable to facilitate a delivery of the selected answer in reply to an indication of an incoming communication to the mobile communications device.

19. The handheld mobile communications device of claim 7, wherein:

the response circuit is operable to facilitate a delivery of the selected answer to an originator of the incoming communication.

20. The handheld mobile communications device of claim 7, wherein:

the response circuit is operable to receive an indication of the incoming communication to the mobile communications device.

21. The handheld mobile communications device of claim 7, wherein:

the circumstance analyzer circuit is operable to acquire data indicative of the ambient environmental context of the mobile communications device.

22. The handheld mobile communications device of claim 7, wherein:

the answer selector circuit is operable to provide a user understandable indication of the determined ambient environmental context of the mobile communications device.

23. The handheld mobile communications device of claim 2, further comprising:

means for determining an ambient environmental context of the mobile communications device;

means for selecting an answer to an incoming-communication that is at least substantially responsive to the determined environmental context of the mobile communications device; and means for facilitating a delivery of the selected answer in reply to an incoming communication to the mobile communications device.

24. The handheld mobile communications device of claim 2, further comprising:

the circumstance analyzer circuit is operable to receive data indicative of an ambient environmental context of a mobile communications device;

the circumstance analyzer circuit is operable to receive an indication of an incoming communication addressed to the mobile communications device and originating from another communications device;

the answer selector circuit is operable to select a reply to the incoming communication that is consistent with the ambient environmental context of the mobile communications device; and the response circuit is operable to facilitate a delivery of the selected reply to the another communications device.

25. The handheld mobile communications device of claim 2, further comprising:

a transceiver circuit operable to transmit and/or receive communications.

26. The handheld mobile communications device of claim 2, wherein the circumstance analyzer circuit operable to determine an ambient surrounding of the handheld mobile communications device further includes:

a circumstance analyzer circuit operable to determine an ambient surrounding of the handheld mobile communications device, the ambient surrounding including at least one of a locational setting, a surrounding sound characteristic, a situational context, a state of the handheld mobile device, or a proximity to other handheld mobile communications devices.

27. The handheld mobile communications device of claim 2, wherein the circumstance analyzer circuit is operable to determine an ambient environmental context of the mobile communications device;

the answer selector circuit is operable to select an answer to an incoming-communication that is at least substantially responsive to the determined environmental context of the mobile communications device; and the response circuit is operable to facilitate a delivery of the selected answer in reply to an incoming communication to the mobile communications device.

28. The handheld mobile communications device of claim 27, wherein the circumstance analyzer circuit is operable to infer an ambient environmental context of the mobile communications device.

29. The handheld mobile communications device of claim 27, wherein the circumstance analyzer circuit is operable to determine a locational context of the mobile communications device.

30. The handheld mobile communications device of claim 27, wherein the circumstance analyzer circuit is operable to determine an ambient sound context of the mobile communications device.

31. The handheld mobile communications device of claim 27, wherein the circumstance analyzer circuit is operable to determine an ambient light environmental context of the mobile communications device.

32. The handheld mobile communications device of claim 27, wherein:

the circumstance analyzer circuit is operable to determine independently of an input by a user of the mobile communications device an ambient environmental context of the mobile communications device.

33. The handheld mobile communications device of claim 27, wherein:

the circumstance analyzer circuit is operable to determine a situational context of the mobile communications device.

34. The handheld mobile communications device of claim 27, wherein:

the circumstance analyzer circuit is operable to determine a state externally imposed on the mobile communications device.

35. The handheld mobile communications device of claim 27, wherein:

the circumstance analyzer circuit is operable to determine a user-selected state of a mobile communications device.

36. The handheld mobile communications device of claim 27, wherein:

the answer selector circuit is operable to select an answer to an incoming-communication that is at least substantially appropriate for the determined environmental context of the mobile communications device.

37. The handheld mobile communications device of claim 27, wherein:

the answer selector circuit is operable to select an answer to an incoming-communication that is at least substantially responsive to the determined environment context of the mobile communications device from a group of at least two answers to an incoming-communication.

38. The handheld mobile communications device of claim 27, wherein:

the response circuit is operable to facilitate a delivery of the selected answer in reply to an indication of an incoming communication to the mobile communications device.

39. The handheld mobile communications device of claim 27, wherein:

the response circuit is operable to facilitate a delivery of the selected answer to an originator of the incoming communication.

40. The handheld mobile communications device of claim 27, wherein:

the response circuit is operable to receive an indication of the incoming communication to the mobile communications device.

41. The handheld mobile communications device of claim 27, wherein:

the circumstance analyzer circuit is operable to acquire data indicative of the ambient environmental context of the mobile communications device.

42. The handheld mobile communications device of claim 27, wherein:

the answer selector circuit is operable to provide a user understandable indication of the determined ambient environmental context of the mobile communications device.

* * * * *